United States Patent [19]

Swinehart

[11] 3,930,160
[45] Dec. 30, 1975

[54] GROOVED WINDOWS FOR SCINTILLATION CRYSTALS AND LIGHT PIPES OF HIGH REFRACTIVE INDEX

[75] Inventor: Carl F. Swinehart, University Heights, Ohio

[73] Assignee: Kewanee Oil Company, Bryn Mawr, Pa.

[22] Filed: Feb. 11, 1974

[21] Appl. No.: 441,584

[52] U.S. Cl. ................................ 250/361; 250/362
[51] Int. Cl. ................................................. C01t 1/20
[58] Field of Search ........... 250/361, 362, 363, 366, 250/367, 368, 369, 458, 459, 460

[56] References Cited
UNITED STATES PATENTS 3,531,651   9/1970   Lieber et al. ..................... 250/361
3,784,819   1/1974   Martone et al. .................... 250/366

*Primary Examiner*—James. W. Lawrence
*Assistant Examiner*—Davis L. Willis
*Attorney, Agent, or Firm*—Alfred D. Lobo; James A. Lucas

[57] ABSTRACT

Scintillation crystals are disclosed which have improved resolution and pulse height. An improved crystal has shallow grooves or spot depressions cut in the window, usually an end surface. Typical grooves are about 1.5 mm wide and about .1 mm deep. The grooves may be either horizontal, generally parallel grooves in spaced apart relationship, or concentric rings in radially spaced apart relationship. A light pipe of high refractive index, such as a crystal of pure sodium iodide, may also be improved with shallow grooves or spot depressions cut in an end surface.

9 Claims, 6 Drawing Figures

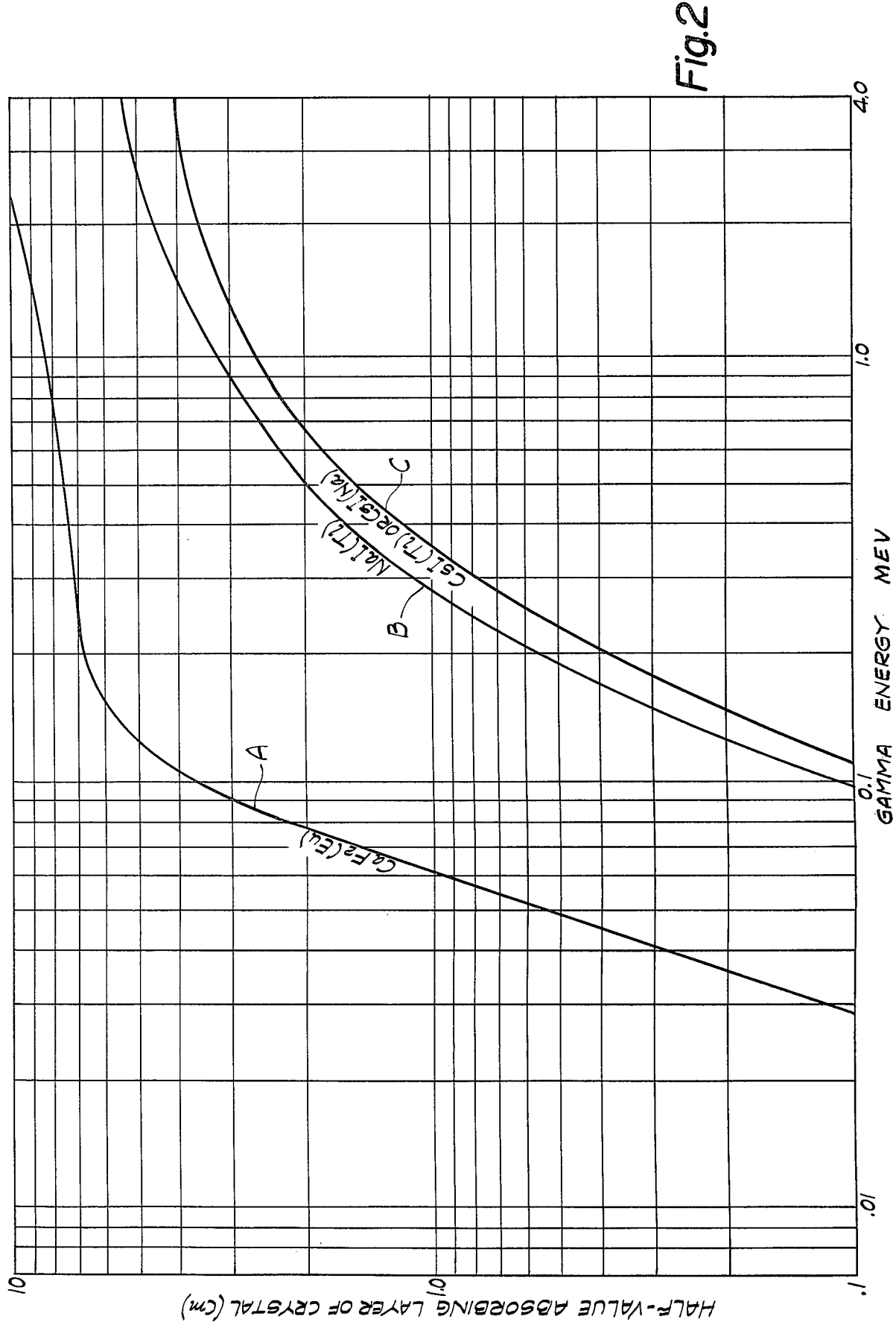

GROOVED WINDOWS FOR SCINTILLATION CRYSTALS AND LIGHT PIPES OF HIGH REFRACTIVE INDEX

BACKGROUND OF THE INVENTION

Scintillation crystals are radiation detectors which function by means of converting radiation energy into light energy. The light energy generated within the scintillation crystal is transmitted through a window area of its surface and measured by some appropriate device, for example with a phototube that converts it into measurable electric current. Scintillation crystals are usually used in some type of scintillation meter, generally to measure gamma ray radiation which strikes the crystal causing flashes of light to occur within it. The flashes of light or scintillations are directed to the photomultiplier tube where they are converted into an electric current at the photocathode and then amplified by a system of secondary emitting electrodes within the tube. The current output from the photomultiplier tube is sent to electronic devices which process and display the information contained in the output current. These well known methods of utilizing scintillation crystals are described in the prior art as is the importance of obtaining a crystal which has high resolving power and good pulse height. A discussion of the problems involved may be found in U.S. Pat. No. 3,102,955 issued to Roland W. Carlson. Other discussions with respect to the effect of surface on the optical properties of a scintillation crystal may be found in copending application Ser. No. 177,477 filed Sept. 2, 1971, and in an article titled "Influence of Optical Working on Surface Structure of Plastic Crystals" by Alexander Smakula and Miron W. Klein in "Journal of the Optical Society of America," Vol. 40, No. 11, 748–750, November 1950.

It is well known that the degree of surface roughening of surfaces other than the window area of a scintillation crystal affects the uniformity of light output of the crystal. This means that surface treatment of the crystal is an integral part of the reflector system for the crystal, and that the reflectivity is a function of the surface treatment as well as the reflective material itself. Hence, by adjusting the surface treatment of the crystal in accordance with the response function measured for uniform surface treatment, it is possible to obtain an approximately uniform response with appropriate compensation.

It has been found that, irrespective of known types of surface treatment, and optimum canning techniques for the crystal, much of the light reaching the window from a scintillation event within the crystal is lost before it reaches the window at an angle allowing its transmission. Particularly with crystals which have a high index of refraction, the light generated by an event within the crystal must come to the window at a high angle in order to pass on to a phototube. Light coming to the window at a low angle does not pass through the surface and is reflected back, thus decreasing both the resolution as well as the pulse height characteristics of a scintillation crystal, and for the same reason, diminishes the effectiveness of a light pipe of high refractive index.

None of the techniques for improving resolution described in the foregoing references are as effective as the method of cutting grooves or depressions which produces the crystals of this invention, and none of the known methods for producing a more effective crystal surface is particularly applicable to relatively thin scintillation crystals, that is, crystals having a thickness less than enough to absorb 75% of the gamma radiation being measured. Since most gamma rays to be sensed have an energy in the range from about 0.04 to about 4.0 Mev (million electron volts), this invention particularly relates to scintillator crystals having a thickness in the range from about 0.5 in. to about 3 inches.

SUMMARY OF THE INVENTION

It has been discovered that cutting shallow grooves or depressions in the surface of a scintillation crystal or light pipe of high refractive index, either of which is to be coupled with a photomultiplier tube improves the resolution and the pulse height of the crystal, and the effectiveness of the light pipe, respectively.

It is therefore a general object of this invention to provide a relatively thin scintillation crystal with grooves or shallow depressions cut in a surface thereof, which unexpectedly improves both resolution and pulse height by minimizing the back reflection of light generated within the crystal; and, to provide grooves or shallow depressions in an end surface of a light pipe of high refractive index which improves collection of the light transmitted.

It is another specific object of this invention to provide relatively thin scintillation crystals with a high refractive index and having a thickness of less than about 5 cms. with mechanically cut grooves or depressions in an end surface. The structure of the cut surface improves principally the resolution of the scintillation crystal.

These and other objects, features and advantages of the article of this invention and the method for making it will become apparent to those skilled in the art from the following description of the preferred form thereof and the illustrations set forth herein.

BRIEF DESCRIPTIONS OF THE DRAWINGS

Reference is made to the accompanying drawings in which:

FIG. 2 is a graph showing the computed half-values of an absorbing layer of typical scintillator crystalline materials as a function of gamma-ray energy.

DETAILED DESCRIPTION OF THE INVENTION

The scintillation crystals of this invention are transparent to the wavelength of radiation generated due to a pulse or event within the crystal. By transparent is meant that the crystal is permeable to radiation and has relatively high transmittance, or, that no appreciable absorption of the radiation occurs within the crystal as it transmits the radiation.

It is common in the art to mount a scintillation crystal to respond to impinging radiation by emitting light which passes through a coupling window of optical glass to activate the sensitive photocathode element of a photomultiplier tube of known type.

A commonly used mounting for a scintillation crystal is a thin-walled open-ended aluminum can. The crystal is cemented directly to the inner surface of an optical glass cover which is then inverted and sealed with appropriate reflective powders within the can, the crystal thus being totally enclosed. Various cements, different types of optical glass-coupling elements to couple the glass and the crystal, reflective powders of various types, etc. are well known in the art. These conventional details need not be changed and may be adhered to when the new scintillation crystal described hereinbelow is substituted for the old.

Figure 1:
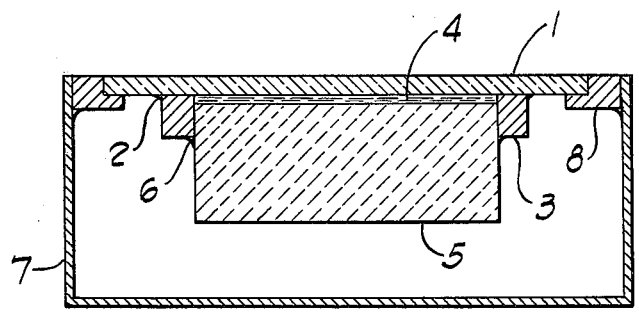
FIG. 1 is a schematic illustration of a scintillation crystal cemented to an optical window and mounted in a can packed with a reflector oxide material.

Referring now to FIG. 1, the optical window 1 has cemented to it by cement 2 an aluminum mounting ring 3. The optical coupling window 1 may consist of fused quartz, or any other glass highly transparent to the light emitted by the particular scintillation crystal being mounted, or any glass substitute such as polymethylmethacrylate. The scintillation crystal 5 is optically coupled and may be physically attached to the glass window 1 by an air-excluding, transparent, colorless, inert semi-solid but mobile, silicone type liquid 4 which remains in a limited viscosity range over the working temperature to which this scintillation crystal is to be exposed in use. The glass window is coupled to a suitable photomultiplier tube (not shown) when the crystal is to be placed in use, in the usual way. The scintillation crystal 5 fits firmly and tightly in the ring 3 and is cemented all the way around with a toroidal ring 6 of cement. The mounting ring, window, and plate are mounted in a can 7 in an operation commonly performed in a moisture-free atmosphere. The can is provided with a retaining ring 8 which may be soldered, welded or cemented in any suitable manner to the can. The scintillation crystal 5 may be of any scintillation material, and is preferably a high refractive index alkali metal halide, or alkaline earth metal halide, suitably activated with an appropriate activator, usually a metal. Particularly useful scintillators are thallium activated sodium iodide, europium activated calcium fluoride, thallium or sodium activated cesium iodide, and the like. The foregoing scintillation crystals are described in the literature as being more effective when the surface of the window is prepared in a particular manner, for example, as described in U.S. Pat. No. 3,102,955. The thickness of a particular cyrstal material to be used for intercepting gamma ray energy from a known source may be derived in accordance with relationships set forth in a brochure entitled "Harshaw Scintillation Crystals" at pages 11 and 53, inter alia; in a publication of the U.S. Department of Health, Education and Welfare entitled "Radiological Health Handbook" (Revised Edition published January 1970, page 29); and in Harshaw Data Sheet 801 entitled "Nuclear Detectors and Systems." The half-values of an absorbing layer of various crystalline scintillation materials are set forth as a function of gamma-ray energy (Mev) in FIG. 2, wherein curve A is for europium activated calcium fluoride, curve B is for thallium activated sodium iodide, and curve C is for sodium or thallium activated cesium iodide. Gamma-ray energies typically of interest are in the range from about 0.04 Mev to about 4.0 Mev.

Figure 3:
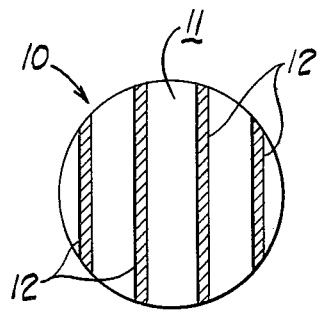
FIG. 3 is a plan view of the window area of a relatively small scintillation crystal provided with linear grooves in the window surface.

Referring now to FIG. 3 a scintillation crystal indicated generally at 10 has the surface 11 cut with shallow grooves 12 in parallel spaced apart relationship on the surface of the crystal adjacent the surface of the optical glass window. In a small crystal, about 1 in. in diameter, an entire end surface of which is to be used as the window area, the grooves are typically about .06 in. wide and about .04 in. deep, three or four being provided in spaced apart relationship one with the other. Depending on the size of the crystal and the window area the grooves may be narrower or wider, preferably in the range from about .035 in. to about 0.5 in. and the depth may range from about .01 in. to about 0.1 in. The physical dimensions of the grooves are not critical except that they are substantially deeper than the roughening effect provided by grinding or sanding the surface of the crystal. The width and disposition of the grooves relative to each other is likewise unimportant, the optimum relationship between these being easily arrived at by trial and error. For example, grooves may be in parallel spaced apart relationship extending substantially over the entire window area of a crystal, or the grooves could be randomly divergent, symmetrically intersecting one another, or, randomly intersecting one another. Though the grooves extend over the entire surface, only a minor portion of the window area of the crystal is grooved, and the major portion remains uncut. The relative areas of grooved and ungrooved portions is not critical but no additionally benefit accrues from cutting grooves in a major portion of the window area. It is further desirable that the grooves be confined to the window area covered by the phototube or other light element such as a light pipe. In normal usage the grooves are provided in a polished window area directly under the phototube. Typically from about 10 to about 50 percent of the window area of the crystal is grooved though an improvement in resolution may be noticeable with only about 1% of the window surface being grooved. Where the crystal is mounted as described in FIG. 1 hereinabove, a coupling fluid covers the polished and grooved surface.

Figure 4:
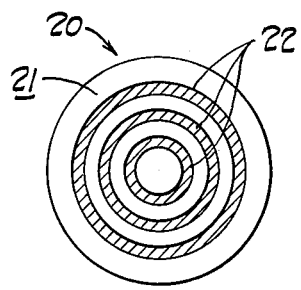
FIG. 4 is a plan view of the window area of a relatively small scintillation crystal provided with concentric grooves in the window surface.

Referring now to FIG. 4, there is shown the surface of a scintillation crystal provided with concentric grooves. As in the previous illustrative embodiment of FIG. 3, the grooves in the crystal are adjacent to the surface of the optical glass window and filled with the optical coupling material. As before, the precise depth and width of the concentric grooves is not critical, nor is their disposition. For small crystals the grooves are typically about 0.06 in. wide and about 0.04 in. deep, three or four grooves being provided in a crystal less than 2 ins. in diameter. In larger crystals the grooves may be wider, up to about 0.5 in. in width, and may be as deep as about 0.1 in. Though concentric grooves are illustrated, the grooves may have any arcuate geometry and may intersect. Only a minor portion of the window area of the crystal is grooved as shown in FIG. 4, and preferably less than about 20 percent. An improvement in resolution may be noticeable with as little as 1% of the window area being grooved.

Figure 5:
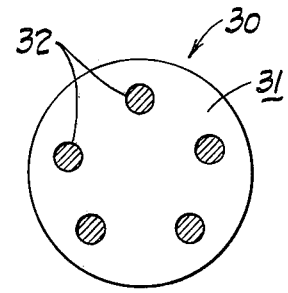
FIG. 5 is a plan view of the window area of small scintillation crystal provided with shallow circular depressions in the window surface.

Referring now to FIG. 5 there is shown a scintillation crystal with plural circular depressions each of which has a roughened surface such as is produced by a cutting tool. The shape of the depression is unimportant, a circular shape being preferred since it is generally easier to cut than other geometrical shapes. Again the area of the depressions in comparison with the window area is not critical, a minor proportion being effective. As with the linear or concentric grooves described in FIGS. 3 and 4 the depth of the depression is generally small in comparison with the width of the depression, the width ranging from about 0.06 in. to about 0.5 in., and the depth ranging from about 0.04 in. to about 0.1 in., depending on the size of the crystal. The depressions may be uniformly spaced over substantially the entire surface of the crystal, or randomly distributed in spaced apart relationship with each other or in tangential contact with each other or in intersecting relationship with each other.

Figure 6:
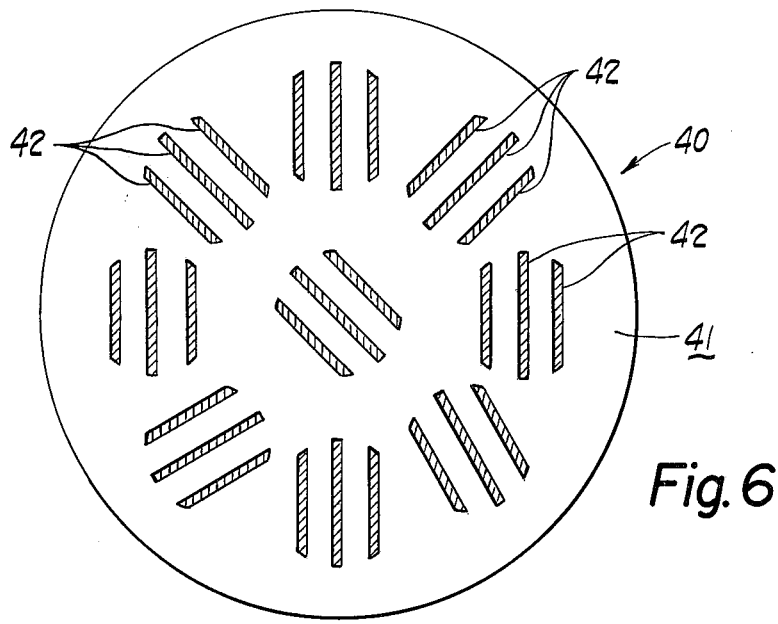
FIG. 6 is a plan view of the polished surface of a relatively large diameter scintillation crystal on which plural photomultiplier tubes are to be disposed on grooved areas.

Though each of the illustrations of FIGS. 3, 4 and 5 refers to relatively small crystals having a diameter essentially the same as that of a phototube, this invention may also be used with relatively large crystals, such as is diagrammatically illustrated in FIG. 6, upon which plural phototubes are disposed. In this embodiment, only the area below each tube is grooved, that is, only the window area for each phototube is grooved. Though linear grooves are illustrated, randomly disposed relative to grooves for adjacent phototubes, the grooves may be arcuate, concentric or intersecting. Rather than grooves as explained hereinbefore, depressions may be cut. Whether the surface of the crystal is grooved or has depressions cut thereon, it will be seen in FIG. 6, that only a small portion of the entire crystal surface area is disfigured.

The following Table I is a tabulation of comparative results obtained with various thallium activated sodium iodide, NaI (Tl) crystals, each about 1 in. diameter and 1 in. thick, used to monitor a Cs-137 gamma ray source. The measurements are made with the same gamma ray spectrometer, before and after grooving, the crystal being otherwise unchanged. Each of the four crystals is taken from a different ingot which fact is reflected in the range of values for resolution before grooving. This range of values is not unusual for different ingots and may even be found in the same ingot, though to a lesser degree.

TABLE I

| Crystal No. | Before Grooving Resolution % | *Rel. Pulse Height % | Groove Design | After Grooving Resolution % | *Rel. Pulse Height % |
| --- | --- | --- | --- | --- | --- |
| 1 | 8.1 | 111 | 2 linear | 6.65 | 137 |
| 2 | 7.8 | 111 | 3 linear | 6.9 | 132 |
| 3 | 8.4 | 106 | 2 con.cir | 6.95 | 135 |
| 4 | 9.0 | 105 | 3 con.cir | 6.6 | 133 |

*compared to a standard RPH of 100% for a reference crystal of NaI (Tl) 1 inch diameter, 1 inch thick.

Since the problem with which this invention is concerned is a collection of light to obtain improved resolution it will be seen that this invention is particularly directed to relatively thin scintillation crystals, in the range from about 1 to about 5 cm. thick, where back-reflection of light is appreciable and a significant fraction of the scintillation events occur close to the window surface. This significant fraction may vary with the quality of the crystal and the energy of the incoming rays, but is always sufficient to adversely affect the resolution. For these events which occur close to the window surface, the efficiency of light collection by the phototube differs from those events in more remote regions of the crystal, making for poor resolution. The grooves may likewise be provided in thicker crystals but the improvement provided by the grooves is less dramatic than that in thin crystals, because, in thicker crystals, most of the light emitting events occur at some distance from the window.

A particular application of this invention is for improving resolution in coupled scintillation crystals, as for example, where crystals of NaI(Tl) and LiI(Eu) are coupled with an interface compound. Such a coupled crystal may be used for the simultaneous detection of gamma rays and neutrons with a single phototube disposed on the NaI(Tl) crystal. Each of the end surfaces coupled by the interface compound is preferably grooved, as is the end surface of the NaI(Tl) crystals to be coupled to a phototube, and the coupled crystals are found to have better resolution than identical, but ungrooved, coupled crystals.

It has been found that collection of light arriving at a transmitting surface is improved by the presence of grooves or shallow depressions cut in the surface of the crystal, irrespective of the direction from which light arrives at that surface. This discovery is also applicable to transparent light pipes of relatively high refractive index, such as are commonly used in combination with scintillation crystals, to improve collection of light at one or both end surfaces of the light pipe. Improved collection of light results in better readings. For example, it is sometimes desirable to protect a scintillation crystal from radioactivity of a photomultiplier tube by interposing a light pipe between the crystal and the phototube. Typically the light pipe may be a pure crystal of NaI, or other inorganic ionic crystal of a relatively high refractive index, preferably approximating the refractive index of the scintillation crystal to be protected. Any other transparent material suitable for a light pipe may be used, as for example, synthetic polymeric resinous materials including methyl methacrylate and the like, but it is found that the improvement in performance is of a lesser degree than that observed for crystalline ionic halides of the alkali metals and alkaline earth metals. The surprising improvement in performance of light pipes made from these ionic halides is attributable to their high refractive index which is generally higher than that of suitable organic materials.

Modifications, changes and improvements to the preferred forms of the invention herein disclosed, described and illustrated may occur to those skilled in the art who come to understand the principles and precepts thereof. Accordingly, the scope of the patent issued hereon should not be limited to the particular embodiments of the invention set forth herein, but rather should be limited by the advance by which the invention has promoted the art.

I claim:

1. In a crystal for use with light collection means coupled thereto, the improvement comprising a transparent scintillation crystal having at least one shallow groove or depression in the crystal light transmitting surface through which light generated within the crystal is transmitted to the light collection means.

2. The scintillation crystal of claim 1 wherein said groove or depression is substantially wider than it is deep, the depth of said groove or depression being in the range from about 0.001 in. to about 0.125 in.

3. The scintillation crystal of claim 1 including a plurality of shallow grooves or depressions in said crystal light transmitting surface through which light generated within the crystal is transmitted to the light collection means.

4. The scintillation crystal of claim 3 wherein each groove or depression is substantially wider than it is deep, the depth of said groove or depression being in the range from about 0.001 to about 0.125 in.

5. The scintillation crystal of claim 3 wherein said grooves are in parallel spaced apart relationship.

6. The scintillation crystal of claim 3 wherein said grooves are in radially spaced apart relationship.

7. The scintillation crystal of claim 3 wherein said depressions are indentations or spots in spaced apart relationship with one another.

8. The scintillation crystal of claim 3 wherein said grooves or depressions are randomly disposed.

9. A method for improving the resolution and pulse height characteristics of a transparent scintillator crystal having a light transmitting window surface comprising cutting plural shallow grooves or depressions in said window surface, each groove or depression being substantially wider than it is deep, the depth of said groove or depression being in the range from about 0.001 in. to about 0.125 in.

* * * * *

UNITED STATES PATENT OFFICE
CERTIFICATE OF CORRECTION

PATENT NO. : 3,930,160
DATED : December 30, 1975
INVENTOR(S) : Carl F. Swinehart It is certified that error appears in the above-identified patent and that said Letters Patent are hereby corrected as shown below:

Line 12, column 6 of the patent the word "crystals" should be "crystal".

Lines 3 and 5 in Claim 9 the word "window" should be deleted.

Signed and Sealed this eleventh Day of May 1976

[SEAL]

Attest:

RUTH C. MASON
Attesting Officer

C. MARSHALL DANN
Commissioner of Patents and Trademarks